(12) United States Patent
Huxel (10) Patent No.: US 6,863,915 B2
(45) Date of Patent: Mar. 8, 2005

(54) AERATED FLAKE SHORTENING

(75) Inventor: Edward T. Huxel, Ft. Worth, TX (US)

(73) Assignee: Cargill, Inc., Wayzata, MN (US)

( * ) Notice: Subject to any disclaimer, the term of this patent is extended or adjusted under 35 U.S.C. 154(b) by 161 days.

(21) Appl. No.: 09/999,735

(22) Filed: Oct. 24, 2001

(65) Prior Publication Data

US 2003/0082289 A1 May 1, 2003

(51) Int. Cl.$^7$ .................................................. A23D 9/00
(52) U.S. Cl. ....................... 426/312; 426/319; 426/606; 426/607
(58) Field of Search ................................ 426/312, 607, 426/606, 3, 9, 564, 653, 498, 555, 551

(56) References Cited

U.S. PATENT DOCUMENTS

| | | | |
|---|---|---|---|
| 788,446 A | | 4/1905 | Wilson |
| 2,174,365 A | * | 9/1939 | Gudheim .................... 426/607 |
| 2,430,596 A | * | 11/1947 | Zieis .......................... 426/607 |
| 2,882,165 A | * | 4/1959 | Datziel ....................... 426/392 |
| 2,882,166 A | * | 4/1959 | Clarke ........................ 426/392 |
| 2,995,039 A | * | 8/1961 | Melnick ..................... 74/5.41 |
| 3,095,305 A | | 6/1963 | Kearns, Jr. |
| 3,253,927 A | * | 5/1966 | Going ......................... 426/607 |
| 3,514,297 A | | 5/1970 | Campbell, Jr. et al. |
| 3,549,387 A | | 12/1970 | Howard |
| 3,637,402 A | | 1/1972 | Reid et al. |
| 4,272,558 A | | 6/1981 | Bouette |
| 4,891,233 A | | 1/1990 | Belanger et al. |
| 5,215,779 A | * | 6/1993 | Dake et al. ................. 426/601 |
| 5,470,598 A | * | 11/1995 | Scavone ..................... 426/607 |
| 5,866,187 A | | 2/1999 | Kines et al. |
| 6,033,703 A | * | 3/2000 | Roberts et al. ............. 426/312 |
| 6,054,167 A | | 4/2000 | Kines et al. |
| RE36,785 E | | 7/2000 | Colson et al. |
| 6,579,554 B2 | * | 6/2003 | Moder |
| 6,579,557 B1 | * | 6/2003 | Benjamins et al. ......... 426/603 |
| 6,589,583 B1 | * | 7/2003 | Hansen |
| 2001/0043978 A1 | * | 11/2001 | Moder |
| 2002/0142072 A1 | * | 10/2002 | Huxel .......................... 426/98 |
| 2002/0155208 A1 | * | 10/2002 | Benjamins et al. ......... 426/564 |
| 2003/0039734 A1 | * | 2/2003 | Huxel ......................... 426/524 |

OTHER PUBLICATIONS

Corriher, S. O. 1997. Cookwise. William Morrow and Company, Inc., New York, p. 106,107, 136, 142.*
Kamman, M. 1997. The New Making of a Cook. William Morrow and Company, Inc, New York, p. 1057–1059.*
Bailey's Industrial Oil and Fat Products, vol. 3, Thomas H. Applewhite.
Research Department Technical Bulletin, vol. XIX, Issue 11, Thomas A. Lehmann Nov. 1997, pp. 1–6.

* cited by examiner

*Primary Examiner*—Carolyn Paden
(74) *Attorney, Agent, or Firm*—Shughart Thomson & Kilroy P.C.

(57) ABSTRACT

An aerated flaked fat product is provided and a process for production of aerated flaked fat products is provided, the process allows the incorporation of gas into the aerated flake fat product and the aerated flake product permits the incorporated of addition air spaces into baked pastry and dough products while allowing a reduction in the amount of flaked fat product incorporated into the dough mix.

48 Claims, 3 Drawing Sheets

AERATED FLAKE SHORTENING

FIELD OF THE INVENTION

The present invention relates to shortenings for use in baking, specifically, the present invention relates to solid flaked shortenings. In particular, the present invention provides for a product and a process of manufacture for producing and using a flaked shortening which contains an increased volume percentage of gas.

BACKGROUND OF THE INVENTION

For many years liquid fats have been aerated with a gas, such as air or nitrogen, to produce a plastic shortening. In the industry such aerated shortenings are known as plastic shortenings. They are called "plastic" as the shortening is in an easily deformable state without being fluid. A number of related processes have been used to create such aerated fats. In general, the liquid form of the fat and a gas, usually filtered air, are mixed, subjected to a high pressure, chilled and agitated to produce crystallization, and packaged. The primary utility of aerating the fat is in the improvement of the appearance of the shortening. An unaerated shortening has a yellowish, translucent appearance and is distinctly unappetizing to consumers. An aerated shortening, on the other hand, in which the gas is uniformly dispersed in very small bubbles, has a white opaque appearance which is very acceptable to consumers. In addition aerated shortenings are softer than unaerated shortenings and can be more easily creamed when they are being combined with other ingredients. However, while such plastic shortenings have been aerated for many years it is important to appreciate that the aeration of the fat provides little contribution to the development of air voids or air bubbles or air pockets in the dough or the final baked product produced with the aerated plastic shortening.

The standard methods for producing plastic shortenings involve heating the shortening to a temperature above the melting point of the solid components, rapidly chilling the liquid fat in a scraped surface heat exchanger to provide minute crystal nuclei, passing the cooled fat through a crystallizing unit in which crystallization can continue with mild agitation, and storage of the fat at a constant temperature in a final crystallization step called "tempering." In one process, the aerating gas is injected into the fat prior to chilling, and the fat is maintained under high pressure during the chilling and crystallization stages to ensure that the injected gas is retained in solution. After the crystallization stage, the fat is passed through a throttle valve, also known as an extrusion valve, where the pressure on the fat is released and the dissolved gas comes out of solution and is dispersed in the fat as minute bubbles. The fat is then packed and maintained in a constant temperature room at about 80° F.–90° F. Other process methods have modified this basic process to shift the injection of gas to a point in the process that is after the crystallization stages. These types of processes are described in "Bailey's Industrial Oil and Fat Products," Vol. 3, Thomas Applewhite, Ed.; Wiley-Interscience, New York, pages 101–103.

Processes for producing aerated shortening are described in the patents to Dalziel et al. U.S. Pat. No. 2,882,165 and Clarke U.S. Pat. No. 2,882,166. A process for producing an aerated shortening with a higher gas content is described in the patent to Kearns U.S. Pat. No. 3,095,305. These prior art processes operate at relatively high pressures, at least in the initial stages, primarily for the purpose of maintaining the gas in solution in the liquid fat. As indicated in the prior art, considerable difficulty has been encountered in obtaining a uniform product when using a relatively high level of gas.

Figure 3:
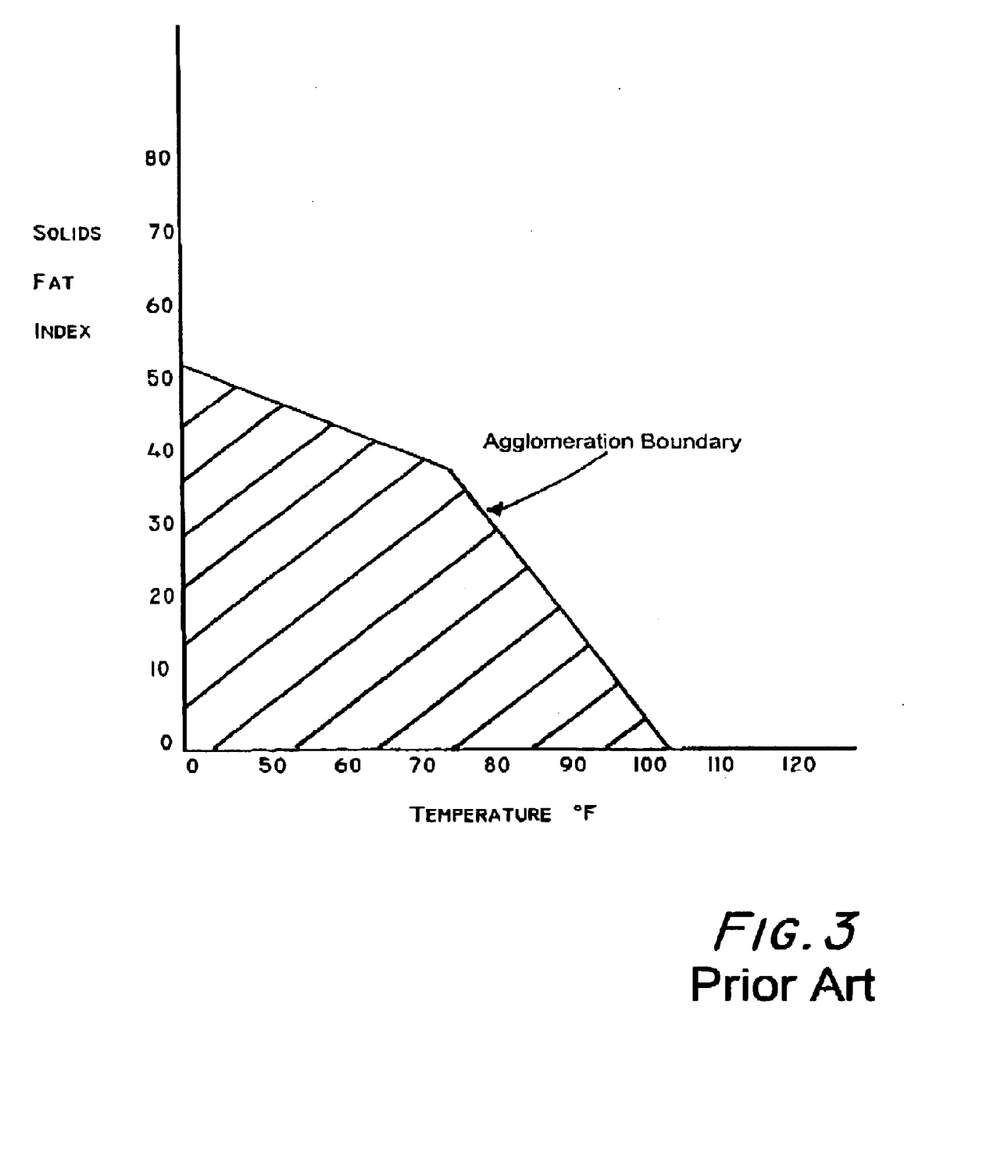
FIG. 3 is graph of temperature with respect to the Solids Fat Index of a mixture of triglycerides and showing the various solids and liquid content of the mixture at different temperatures and showing the agglomeration boundary AB for such mixtures.

Also, it has long been known that fatty substances could be cooled to a solid or semi-solid by applying a hot or warm liquid or semi-liquid of the fat to a cooled rotating drum or continuous cooling belt. In U.S. Pat. No. 788,446 to A. R. Wilson, a liquid fat is sprayed onto a rotating drum or cylinder which is cooled with ice or ice and salt. As the drum rotates, the previously applied liquid is scraped from the drum, and the scraped area of the drum is then subsequently presented for another application of the fat or liquid to be congealed. However, while these cooling processes are successful for many types of fats, they are unable to provide sufficient cooling during their cycle of operation to sufficiently chill fats and oils which have solids compositions which fall below the agglomeration boundary (line AB) of a Solids Fat Index such as is shown in FIG. 3. In such cases alternative flaking processes must be used.

FIG. 3 shows the solids content of a mixture of fats at various temperatures. The Solids Fat Index is a manufacturing standard used to measure the extent of hydrogenation in the fat components used in a mixture. Over a limited range, the Solid Fat Index (SFI) value is numerically, approximately equal to the actual percent solids in the mixture. At high temperatures, the fat product will be completely melted. At low temperatures, the fat can be completely solid. In between these low and high temperature ranges, there are varying degrees of solid fat content in the fat composition. By selection of varying degrees of hydrogenated triglycerides, and/or blended liquid and solid fats a variety of SFI profiles for various fat compositions can be developed.

For mixtures of hydrogenated triglycerides having solids compositions which fall below the agglomeration boundary, conventional chilled drum and chilled belt methods of flaking do not provide sufficient chilling time or sufficient temperature reduction in the mixture to: (1) produce sufficient nucleation in the fat mixture to allow flaking; (2) prevent the solidified fat from forming a sheet of material rather than flaking; and (3) reduce the temperature of the solidified material sufficiently to avoid re-melting of the material due to the latent heat of crystallization once the material is removed from the belt or roller and packaged.

Yet another drawback of the use of drum cooling for materials of the kind previously described is that when the melting point of the material becomes sufficiently low, generally 105° or below, the latent heat of crystallization will tend to be sufficient to virtually remelt the material or to cause the flakes or chips of the material to become a connected mass within the packaging material. Therefore, the use of rotating drum devices to cool materials having low melting points becomes ineffective, and triglycerides and other oils which have low melting points cannot be mixed with other substances which would have the effect of lowering the melting point of the triglyceride or the fatty substance to a point at which the drum cooling method would be ineffective as a result of the latent heat of crystallization causing the newly solidified material to form a mass once placed into packaging.

It will be appreciated by those skilled in the art that increasing retention time on the cooled rotating drum is an insufficient solution to this problem. Depending on the material being applied to the drum, if it is cooled too completely while on the drum, it will crack away from the drum and fall off the drum prior to it reaching the scraper blade or reaching a point at which collection of the material is desired. In certain types of drum cooling systems, the liquid is applied by the bottom of the drum rotating through a vat or pool of warmed liquid. The liquid then adheres to the drum and is cooled during the rotation of the drum, and the material is scraped from the drum prior to a second emersion in the vat of liquid. In this situation, slowing the drum can result in substantial loss of heat into the vat of hot or warm oil or triglyceride and can result in the heating of the material in the vat and the cooling of the drum operating at cross purposes.

To overcome this limitation of the drum cooling method a flat plate flaker device and method of operation has been developed. This flat plate flaker device is the subject of pending U.S. patent application Ser. No. 09/659,530 filed Sep. 12, 2000, and the contents of that application are incorporated herein by reference. As fully discussed in application Ser. No. 09/659,530, the flat plate flaker can provide adequate cooling for oils and oil blend for which the melting point of the material is sufficiently low, generally 105° or below, that the latent heat of crystallization will tend to be sufficient to virtually remelt the material or to cause the flakes or chips of the material to become a connected mass within the packaging material. Such a flat plate flake is of use with the process disclosed herein to cool oils and oil blends and, in particular, which exhibit such lower melting points.

The production of bakery goods which are light and fluffy and have a reduced fat content is another area of benefit which is provided by the inventions disclosed herein. Baked products are leavened by: (1) mixing air bubbles into the dough or batter in which the nucleating bubbles are then inflated by evolving and expanding gas; (2) carbon dioxide gas produced during yeast fermentation; (3) carbon dioxide gas produced by a reaction of a leavening acid with sodium bicarbonate or the heat decomposition of ammonium bicarbonate or ammonium carbonate; and/or (4) evaporation of water present in the dough and/or water present in "water in oil emulsion products during baking, commonly referred to as steam leavening."

Generally, gas bubbles are formed only by mixing of the dough or stirring of the batter. The mixer blades create bubbles of air that are entrapped when the dough or batter is drawn into the cavity formed behind the blades. Carbon dioxide produced by the leavening reaction or fermentation then migrates into the nucleating bubbles that were formed during mixing. A large number of such small nucleating bubbles inflated to the desired volume will yield a find cell crumb structure with thin cell walls which is desirable in cakes and muffins. A smaller number of nucleating bubbles inflated to the same volume will result in a coarse crumb with large cells that have thick cell walls which is desirable in hearth breads, pizza crusts and English muffins.

When water is added to flour and physical work (mixing) is applied, glutenin and gliadin combine to form gluten which is the material primarily responsible for gas retention in the dough and for crumb structure. In bread products, gluten formation is critical to proper gas retention resulting in proper baked volume. Plastic shortening interferes with proper hydration and gluten formation, hence plastic shortening are used at lower levels. However, if a shortening could be added at higher levels and at the same time did not interfere with gluten formation, the baker could improve the texture, flavor and shelf life of the product without sacrificing product volume. This problem of interference with gluten formation can be avoided with a shortening product, such as a flaked fat, that does not interfere with gluten formation. A great benefit to baking could be achieved if such a flaked fat also could contribute nucleation bubbles to the dough without interfering with gluten formation. Also by adding an aerated fat flake, the baker could control the addition of nucleating air bubbles rather than relying solely on the degree of mixing. Also, by adding an aerated fat flake, the baker could create a desired texture by merely controlling the size of the aerated fat flake particle size.

The baking industry has long sought alternative methods of introducing air bubbles and air pockets into baked goods. The interests of the baking industry are diverse in this regard. In some products the amount of air captured and air space generated is valued in other products control over the timing of the generation of air bubbles or voids is of primary concern. In commercial and frozen baked goods in particular it is a primary interest that the means of generating air bubbles in the product be able to withstand long periods of freezing temperatures and then be able to produce the desired effect in the dough of generating air space or gas bubbles in the dough.

One means of providing such voids or bubbles in dough has been to incorporate a solid fat flake into the dough. Such solid fat flakes benefit the dough in two ways. First, by the inclusion of a fat in the dough improved the taste and mouth-feel of the dough or cooked crust are provided for the customer. Second, the solid fat flakes occupy space within the dough. When the dough is heated the fat flake melts and a void remains in the dough where the fat flake once existed. As will be appreciated, such solid flaked fats can withstand freezing temperature for long periods of time and still perform at the time of baking. Also, fat flakes do not require particularly special or critical handling during the dough mixing process other than being refrigerated.

In pizza dough, in particular, it has been recognized that solid flaked fats can be incorporated into the pizza dough at an amount of 8–12% (based on the dough flour weight) in addition to the regular oil. The presence of the flaked fat helps to create a desirable, open, course crumb structure in the finished pizza crust. The fat flakes are added to the pizza dough during the last few minutes of dough mixing so that the flakes retain their hard composition and integrity while being mixed into the dough. During the baking process the flakes melt and create the desired large voids in the crumb structure. A typical formula for a prior art self-rising pizza crust is shown in Table 3. (See, American Institute of Baking Research Department Technical Bulletin, Vol. XIX, Issue 11, November 1997.)

TABLE 1

| Ingredient | Amount Baker's Percent (based on flour = 100%) |
| --- | --- |
| Flour | 100 |
| Salt | 1.75 |
| Sugar | 2 |
| Oil | 5 |
| Leavening Acid (SALP) | 0.75 |
| Baking Soda | 0.75 |
| Yeast (Compressed) | 0.25 |
| Water | 50 |
| Hard Fat Flakes (optional) | 8 |
| Reducing Agent | As Required |

It will be appreciated by those skilled in the art that the size of the air space created by fat flakes in a dough is directly proportional to the size of the fat flake. Thus, with current fat flake products the only way to increase the amount of air incorporated into the dough is by increasing the amount of fat flake that is added to the mix. Additional fat flake can be undesirable for several reasons. The additional fat flake can affect the dough recipe, the additional fat can alter the nutritional values of the product, lower fat products are desired by the consumer and the use of additional fat increases costs.

Therefore, a great benefit could be derived by development of a flaked fat product which could act as an improved leavening agent to produce an air space in the dough which is greater than the space occupied by the fat flake itself. A further benefit is would be derived from such a product that did not require the increase in the amount of fat in the recipe to achieve such an increased air space. Another benefit to consumers and to manufacturers could be provided if the total amount of fat in the fat flake could be reduced while the same or increase air space is generated within the dough.

These benefits and more can be achieved by the present invention which provides a flaked fat leavening product and a method for the production of a flaked fat leavening agent which can increase the amount of air space generated in a dough during the baking of the dough and which reduces the amount of fat incorporated into the dough by the addition of the flaked fat product.

Previously, one such aerated flaked fat product has been made by a manual process. However, the resulting product only contained less than 12% by volume of air. Such a product was made by a hand process using a Hamilton Beach seven speed mixer, Model 585-3. During various experiments, oil at temperatures of between 80° F.–98° F. was placed into the blend and whipped at speed number 6 in the mixer. The oil could not be whipped for more than five minutes as the oil would begin to increase in temperature and to release the air which had become entrapped during mixing. The resulting mixture was then poured by hand onto a rotating drum cooler and the product flaked off the drum. The solid flaked shortening product contained less than 12% air by volume. This limited level of gas incorporation was deemed insufficient to provide the necessary cost savings required by manufacturers or to provide a sufficient increase in the amount of air which could be incorporated into baked dough products.

SUMMARY OF THE INVENTION

The present invention provides an aerated flaked fat shortening which can be used in baking to reduce the amount of fat incorporated into a bakery product. Also, the present invention also provides an aerated flaked fat shortening which can be used in baking to increase the amount of voids or air bubbles that are generated in a dough during baking. Further, the present invention provides an aerated flaked fat shortening which can be used in baking to reduce the amount of fat incorporated into a bakery product. The present invention provides an aerated flaked fat shortening which can reduce the amount of fat incorporated into a bakery product while at the same time generating a greater amount of voids or air bubbles in the dough than could be created by using a flaked fat shortening which has not been aerated.

The present invention also provides a method of manufacturing an aerated flaked fat shortening. The process comprises cooling an oil or oil blend to a temperature that is below the melting point of the oil while providing continuous agitation, the cooled oil is then injected with a gas or air and the oil and gas mixture is then pushed through an extruder to divide and distribute the gas in the oil mixture after which the oil and gas mixture is remixed prior to cooling the oil and gas mixture on a suitable flaking apparatus which is selected according to the melting point characteristics of the oil or oil blend.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted a limiting, but merely as a basis for the claims and as a representative basis for teaching one skilled in the art to variously employ the present invention in virtually any appropriately detailed structure.

Figure 1:
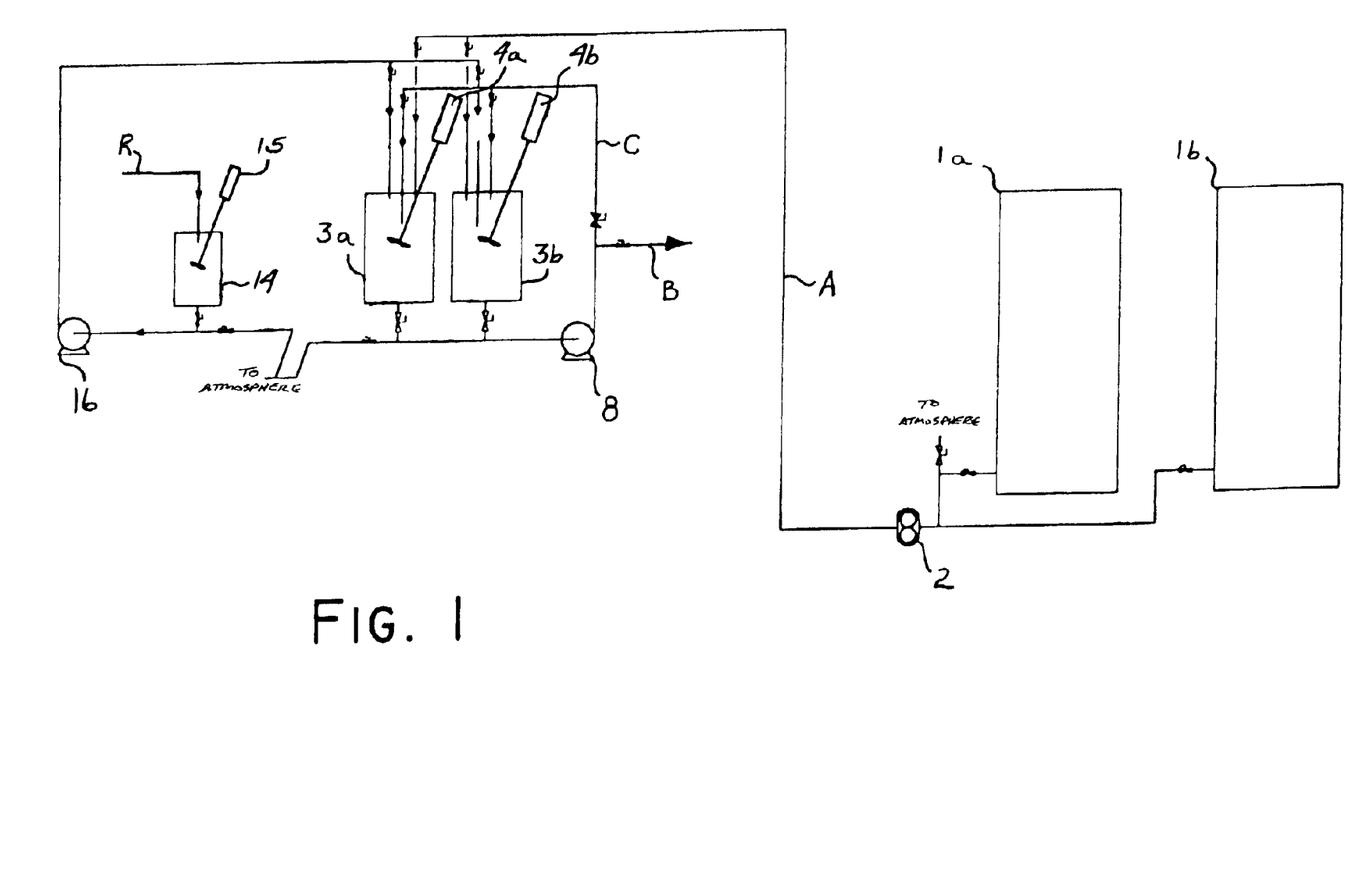
FIG. 1 is a schematic diagram of a first portion of the process system and showing the holding tanks, the mixing and measuring apparatus and the remelt apparatus.

Referring now to FIG. 1, a selected oil, such as liquid hydrogenated soy bean oil is held in storage tanks 1a and 1b. Oil storage tanks 1a, 1b are jacketed for the control of the oil temperature. Initially, to provide adequate flow through the system, the oil contained in tanks 1a, 1b is maintained at a temperature above the melting point of the oil. For example, in the case of liquid hydrogenated soy bean oil, the soy bean oil has a melting point of 112 degrees Fahrenheit to 115 degrees Fahrenheit. The soy bean oil is maintained at a temperature of approximately 120 degrees Fahrenheit to 130 degrees Fahrenheit to maintain proper flow characteristics. In operation, oil is pumped from tanks 1a, 1b by positive pump 2 and through processing line A and into measuring and mixing tanks 3a, 3b. Mixing tanks 3a, 3b are equipped with agitators 4a, 4b which allow the mixing of additional ingredients into the oil that has been pumped from oil storage tanks 1a, 1b. For example, in mixing and measuring tanks 3a, 3b it is useful to add in coloring agents and flavoring agents or baking ingredients such as sodium bicarbonate into the oil. Agitators 4a, 4b are high speed mixers and operate to blend any added ingredients into the oil and to maintain in suspension any added materials which are in solid form. By way of example and not limitation, it may be desirable at this juncture in the process to add to the oil flavoring ingredients which are insoluble in the oil but which when ultimately distributed into a cooking dough, impart flavor to the dough. For the purpose of weighing oil and other ingredients, it should be appreciated that mixing tanks 3a, 3b can be mounted on scales. Alternatively, the principle ingredient, the oil, can be measured volumetrically within tanks 3a, 4b and other ingredients weighed out at a separate station for addition into the oil contained in tanks 3a, 3b.

After the oil has been measured and mixed in tanks 3a, 3b, the oil is then be moved into processing line B through the use of pump 8 which circulates the measured and mixed oil, or now the oil blend, from tanks 3a, 3b through the processing line B. The oil which is not directed through processing line B can be recirculated back into mixing and measuring tanks 3a, 3b by being diverted through line C.

Mixing and measuring tanks 3a, 3b also receive a return flow of the oil blend from the processing line. Oil blend which is returned from the processing line is delivered into remelt tank 14 by line R. In remelt tank 14, the oil blend from the return processing line of line R can be held and rewarmed to an appropriate temperature and any solids being suspended within the oil blend can be maintained in suspension by agitator 15. One important use for remelt tank 14 is during the initial setting up of a production run, it is frequently the case that the operating parameters of the system will require some adjustment before correct operation of the system and the process is achieved. During such start up periods, the availability of remelt tank 14 to receive the oil blend from the processing line which is not yet properly operational, avoids wasting oil blend during the set up procedure. Also, the ability to circulate oil completely through the system prior to full operation ensures that melted oil is completely filling the system, and that no portion of the processing line contains partially melted oil.

Figure 2:
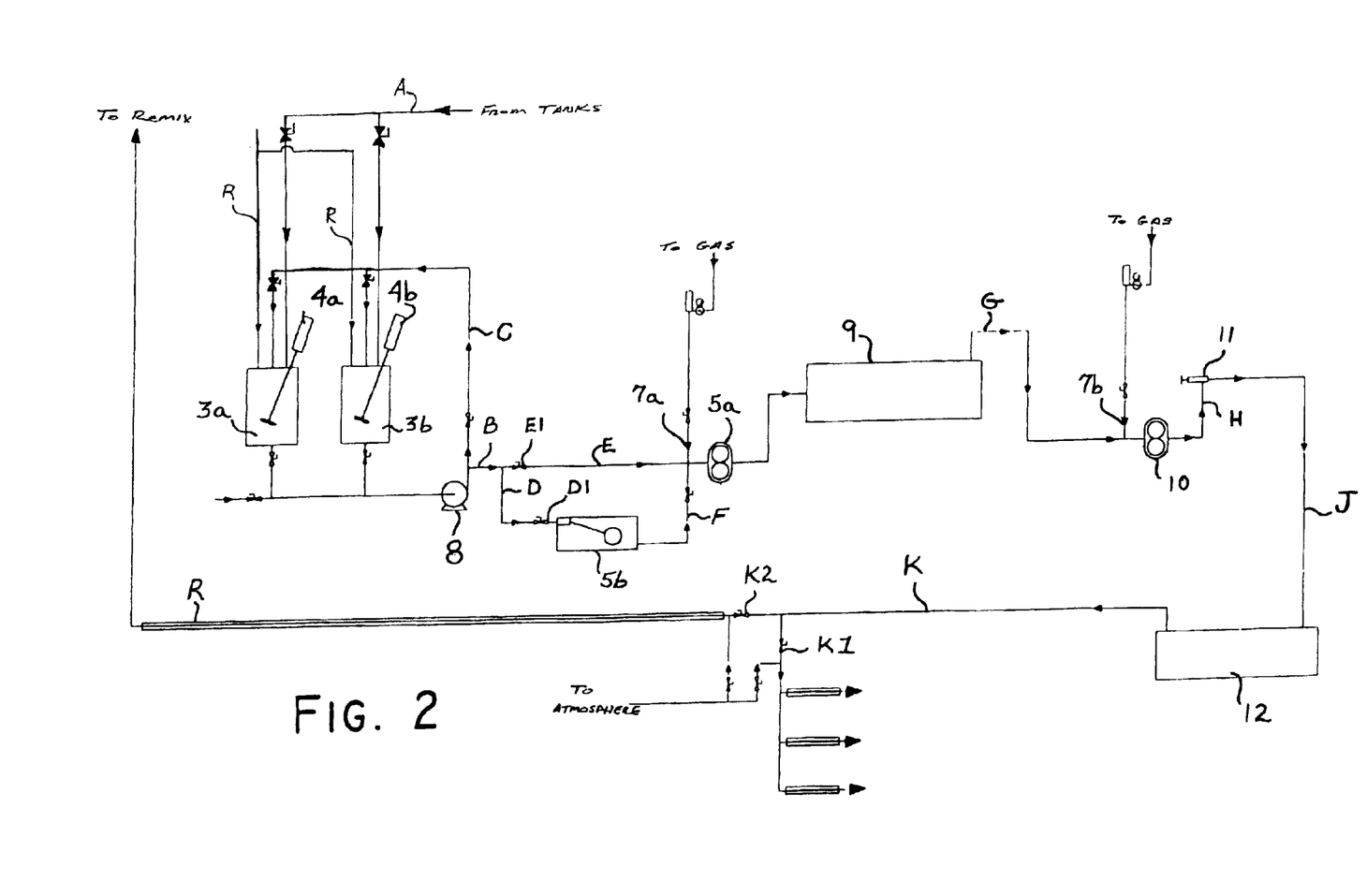
FIG. 2 is a schematic diagram of a second portion of the process system and showing the float level supply tank, the scrape surface heat exchanger, the gas sparger, the pin worker apparatus and the flaker apparatuses.

Referring now to FIG. 2, when the oil blend is pumped from measuring and mixing tanks 3a, 3b by pump 8 and into line B, the oil is either fed from line B into line D where it is allowed to flow into float level controlled suction side supply tank 5b or the oil can flow from line B through valve E1 and into line E where it avoids suction side supply tank 5b and is directed immediately into pump 5a for continuing in the processing line. Float level controlled suction side supply tank 5b is used to ensure that liquid oil blend is drawn into the system by pump 5a without pressure fluctuation caused by pump 8. As hot liquid oil is deposited in tank 5b, any solid residue will float on the top of tank 5b and will not be drawn into processing line F which is withdrawing liquid oil from the bottom of supply tank 5b. As pump 8 can create some degree of backpressure on line D and as it is desirable to have a constant flow rate of oil to maintain proper system control suction side supply tank 5b can compensate for any backpressure on process line D while providing a sufficient reservoir of oil to achieve a constant flow rate to pump 8.

Oil is sucked from the bottom of supply tank 5b due to suction created by positive gear pump 5a to which line F is attached. In a preferred embodiment, pump 5a is equipped with variable speed control. While a variety of speed controls can be used, an A.C. frequency speed controller is used in a preferred embodiment.

In one embodiment in the present invention, it is contemplated that a selected gas such as air or nitrogen or other gas of choice can be added into processing lines E or F by sparger 7a which interconnects with processing lines e and F. In a preferred embodiment, sparger 7a is comprised of a tube having a plurality of voids therein to allow the escape of gas from the voids. The sparger tube is of a smaller diameter than processing lines E or F, and the sparger tube 7a is inserted into processing lines E, F in a coaxial relationship. This permits the oil blend to flow past nitrogen or gas sparger 7a so the gas or nitrogen is bubbled into the oil blend and absorbed therein. However, in a preferred embodiment, the gas or nitrogen is not added into the process through use of sparger 7a, but is added in at a different location in the processing line by sparger 7b which will be discussed hereinafter. It has been determined that introducing the gas into the oil blend at the location of sparger 7a generally produced lower amounts of entrained gas that can be obtained by use of sparger 7b.

As previously described, positive pump 5a withdraws oil blend from supply tank 5b through line F and feeds the oil blend into a scrape surface heat exchanger 9. Heat exchanger 9 is cooled by the recirculation of liquid ammonia through the outer cooling jacket of heat exchanger 9. The oil blend within heat exchanger 9 is constantly agitated by a rotating scraper that removes any oil blend which is beginning to solidify from the walls of the heat exchanger and remixes the partial solids into the oil blend. During the time which the oil blend resides in heat exchanger 9, the oil is cooled to a temperature which will provide the oil blend with a viscosity which will allow the gas which is later to be sparged into the oil blend to be retained within the oil blend. In the case of the hydrogenated soy bean oil being used as an example of the operation of the present process, the soy bean oil is cooled to a temperature of between 84 degrees Fahrenheit to 90 degrees Fahrenheit.

The control of the temperature of the oil blend as it emerges from the heat exchanger is critical to the operation of the process and to the composition of the final product. If the oil blend emerges from heat exchanger 9 at too high a temperature, the viscosity of the oil will be too low to entrap the desired amount of gas within the oil. If the oil blend emerges from heat exchanger 9 at too low a temperature, the product will be too viscous, and the oil blend may solidify within the process line or too much gas will be entrapped in the oil blend. Yet another aspect of proper temperature and viscosity of the oil blend as it leaves heat exchanger 9, is the need to have the oil blend function at a flow rate which will ultimately allow proper coverage of the flaking device used to form the final product. If a flaking roller device is used, it is necessary to have a flow rate which will allow proper coverage of the flaking roller and provide the desired thickness of the oil blend on the roller so that the desired thickness of the flake or chip is attained.

While the general principles of operation of the present process and system with respect to the use of heat exchanger 9 to reduce the temperature of the oil blend have generally been described, the use of other oil blends having different melting points will necessitate variations in the temperature of the oil blend as it exits heat exchanger 9. A proper temperature range can be determined with a few trials for most oil blends. Also, it is recognized that the selected temperature for the oil blend as it exits heat exchanger 9 will depend on the amount of gas which the operator wishes to entrain within the oil blend.

In Table 2 typical oil exit temperatures from the heat exchanger are shown with the observed level of gas incorporation achieved at the selected temperature for an oil having a melting point of 104° F. The data of Table 1 is for an oil having the following parameters:

TABLE 2

Oil melting point 104° F.
Iodine Value 68–71

| Solid Fat Index Temperature | Percentage of Solid Fat Present |
|---|---|
| 50° F. | 62–58% |
| 70° F. | 44–48% |
| 80° F. | 38–41% |
| 92° F. | 18–21% |
| 104° F. | 0.5–2.0% |

| Exit Temperature of Oil from Scrape Surface Heat Exchanger | Maximum level of observed gas (as $N_2$) incorporation (% by Volume) |
|---|---|
| 74° F. | 50–56% |
| 78° F. | 44% |
| 84° F. | 38% |
| 90° F. | 18% |

In Table 3 typical oil exit temperatures from the heat exchanger are shown with the observed level of gas incorporation achieved at the selected temperature for an oil having a melting point of 112°–116° F. The data of Table 1 is for an oil having the following parameters:

TABLE 3

Oil melting point 112–116° F.
Iodine Value 65–66

| Solid Fat Index Temperature | Percentage of Solid Fat Present |
|---|---|
| 50° F. | 62–68% |
| 70° F. | 54–60% |
| 92° F. | 33–39% |
| 104° F. | 14–17% |

| Exit Temperature of Oil from Scrape Surface Heat Exchanger | Maximum level of observed gas (as $N_2$) incorporation (% by Volume) |
|---|---|
| 84° F. | 56% |
| 86° F. | 50% |
| 88° F. | 47% |
| 91° F. | 42% |
| 94° F. | 35% |

As the oil blend leaves heat exchanger 9, it is cooled to a determined temperature range which will provide a selected oil viscosity that will allow the desired amount of gas to be taken up by into the oil blend while allowing the oil blend to flow through the remainder of the process system. The oil blend exits heat exchanger 9 by process line G, and the oil blend is then drawn past sparger 7b by positive pump 10 having variable speed control. Gas sparger 7b operates in the fashion previously described for gas sparger 7a. In the preferred embodiment of the present process, the gas is added into the oil blend at sparger 7b which is in process line G and after the use of heat exchanger 9 to establish the preferred temperature range and viscosity of the oil blend for accepting the gas. The gas or nitrogen is fed into sparger 7b by a storage tank which holds the gas or nitrogen at high pressure. A pressure regulator is used to determine the pressure of the gas as it exits the storage tank, and the amount of gas released through sparger 7b is controlled by a flow regulator having a tube and float ball-type flow indicator. The gas delivery line to sparger 7b is equipped with a check valve to prevent backflow of the oil blend into the nitrogen lines should pressure drop in the gas lines.

It will be appreciated by those skilled in the art that the inventive process and in particular the entrainment of gas into the oil can be alternatively regulated by establishing a fixed operational temperature of the oil as it exits from heat exchanger 9 followed by variation in the amount of gas being introduced into the system at sparger 7b. Under this method of operation a temperature for the oil, usually a lower temperature, will be selected which will allow the oil the accept a wide range of gas volumes. The operator can then adjust the amount of gas entrained into the oil or oil blend by increasing or decreasing the gas flow by use of a gas regulator at sparger 7b.

In operation, as positive pump 10 draws the oil blend through line G, the gas is added to the oil blend by sparger 7b on the suction side of pump 10. Pump 10 is a positive gear pump having a variable speed control. In the preferred embodiment, an A.C. frequency speed controller is used to adjust the speed of pump 10. It will be appreciated by those skilled in the art that with the addition of substantial percentages of gas into the oil blend, that the volume of the oil blend in line G will increase just prior to contacting pump 10. Therefore, it will be appreciated that the volumetric speed at which pump 10 is operated is greater than the volumetric speed or displacement of pump 5a in order to compensate for the addition of the nitrogen to the oil blend. There is, however, not a significant increase in pressure in the system as a result of this increase of pump 10. While a preferred embodiment of the present invention uses positive gear pumps with variable speed controls to move the oil blend through the processing lines, it will be appreciated by those skilled in the art, that other commercially available in-line mixers and/or colloidal mixers with built-in gas spargers may be used. Further, it will be appreciated that these alternative devices could replace the positive gear pump. In the preferred embodiment, the gear pump provides sufficient mixing and shearing of the gas bubbles within the oil blend.

After exiting positive pump 10, the oil blend is pushed through line H and into extrusion valve 11. Extrusion valve 11 is equipped with an adjustable spring control to vary the pressure on the extrusion orifice. Extrusion valve 11 provides additional disruption of the gas bubbles within the oil blend and divides and breaks the gas bubbles into smaller bubbles within the oil blend. Upon exiting extrusion valve 11, the oil blend is moved along process line J and into pin worker 12. Pin worker 12 is provided with a variable speed drive. The oil blend which is now aerated with an gas is mixed within pen worker 12 so the oil blend is remixed just prior to being distributed on the various flaking devices to ensure that a uniform appearing and smooth product is obtained. Those skilled in the art will understand that pin worker 12 is essentially a hollow cylinder having finger-like projections extending from the walls in several locations. A rotating rod is centrally disposed within pin worker 12 and tines or fingers projecting from the rod intermesh with those extending from the walls to provide the mixing action. It will be appreciated that the speed of operation of pin worker 12 can affect the overall consistency of the final product. If the speed of pin worker 12 is excessive, there can be a breakdown in the entrainment of small bubbles within the oil blend and a release of gas from the oil blend. If the speed of pin worker 12 is too slow, the end product can have a non-uniform appearance with streaks appearing in the final product. After exiting pin worker 12, the aerated oil blend enters process line K and is either delivered to one of several types of flaking devices, or valve K1 can be closed and valve K2 opened to allow recirculation of the aerated oil blend back to remelt tank 14.

If the oil blend is allowed to flow through processing line K and through valve K1, the aerated oil blend can be delivered to a flat plate flaker or a flake roller or a flaking conveyor for formation of the final product. The operation of the flat plat flaker device is described in U.S. patent application Ser. No. 09/659,530, the contents of which are incorporated herein by reference.

When the oil blend is sent to a flake roller-type device, the aerated oil blend is sprayed onto the rotating, cooling surface of the flaking roller through spray nozzles that provide a wide angle. As the drum rotates, the heat is drawn out of the sprayed aerated oil blend and drawn into the coolant which is circulating through the interior of the roller or drum. At the conclusion of a single revolution of the drum, the now nearly solid product confronts a flat knife which jars the now nearly brittle material from the surface of the roller and causes fracturing of the nearly solid material into flakes. Those skilled in the art of making fat flakes will appreciate that by controlling the temperature and speed of the flaking device that the flake size and thickness can be varied appreciably.

The aerated solid flaked shortening of the present invention can be ground into small particles after the initial solidification on a chilled drum or other device. The smaller particles attained thereby can provide a benefit to frozen batters as in such frozen batters there is a loss in nucleated air voids. By use of the aerated solid flaked shortening of the present invention the air is entrapped in the shortening until use and cannot escape until baking causes melting of the flaked shortening.

The addition benefits to baked products with the aerated solid flaked shortening, whether it is ground or not, include:

1. Being a flowable product, the aerated solid flaked shortening can be blended with the flour continuously as other ingredients are added;
2. Minute gas bubbles are entrapped in the aerated solid flaked shortening and the gas is not released until the product is baked;
3. The aerated solid flaked shortening is solid and when mixed, it doesn't interfere with gluten formation by coating the protein preventing hydration;
4. By using the aerated solid flaked shortening higher amounts of fat can be added to improve texture, volume, and flavor, and increase shelf life of products;
5. It is possible that ingredients such as eggs, vital gluten, and emulsifiers can be reduced giving a cost savings; and
6. With the increased nucleation provided by the aerated solid flaked shortening it may be possible to use lower levels of protein in the flour to produce the same volume.

In butter products, mixing and choice of ingredients are critical to aeration of the product. With the use of the aerated solid flaked shortening of the present invention mixing and the choice of leavening and acids are not as critical. It may be possible to reduce the amount of fast acting leavening acid in the product.

Those skilled in the art will now appreciate that the aerated solid flaked shortening of the present invention provides the following advantages over regular fat flakes:

1. Nucleation is provided without mixing. The nucleating source, the entrained gas, is contained within the aerated solid flaked shortening;
2. The gas for nucleation is entrapped in the product and forms a gas bubble only when the fat melts during baking.
3. With the aerated fat flake shortening, the amount of nucleated bubbles produced by the amount of mixing (over or under), freezing, proofing, or forming is not affected. Only temperature and melting point of the fat affect when the gas is released.

Hence the aerated flake solid shortening provides nucleation, leavening (expending gas), and increases the size of the voids when compared to 100% fat flakes. If used based on an equal volume substitution, there is a cost savings and a fat reduction giving less calories in the finished product.

In use, the aerated solid flakes of shortening can be substituted into bakery doughs and batters. The aerated solid flakes of shortening can provide additional shortening to these doughs and batters which will not interfere with gluten formation and will provide an additional source of nucleation sites or voids for $CO_2$ collection and gas expansion in the dough or batter upon heating.

Applications for the aerated solid shortening flakes will now be described. In the case of the pizza dough formula of Table 1 (supra) the hard fat flakes can be substituted with only 4% of the aerated solid shortening flakes having a gas content of about 20 vol-%. This substitution can provide reduced fat content and increased air voids in the pizza dough.

Batters, such as pancake batters and in particular frozen batters can benefit greatly from the present invention. In one application of the aerated solid shortening flakes to batters, the flakes are ground prior to inclusion in the batter. The grinding provides small aerated solid shortening particles which spread within the batter to proved even air voids throughout the batter. This is particularly important with frozen batters as during the freeze-thaw cycle a batter product sustains a great loss of entrained $CO_2$ and the rising of the batter during cooking is severely compromised.

Doughs, generally, can incorporate the aerated solid shortening flakes to provide increased nucleation sites for the collection of $CO_2$ gas produced by leavening agents. In this application the flakes are mixed into he dough and disbursed. Upon heating the shortening melts providing a void and gas bubbles which can expand with the heating.

In bread doughs the aerated solid shortening flakes to provide increased nucleation sites for the collection of $CO_2$ gas produced by leavening agents and allow an increase the amount of shortening which can be used in the bread dough while avoiding interference with gluten formation.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive aerated flake and aerated flake process is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A pourable flaked solid shortening comprising a gas present in a concentration of between 15 vol-% and 60 vol-%.

2. The shortening as claimed in claim 1 wherein said gas concentration is between 20 vol-% and 55 vol-%.

3. The shortening as claimed in claim 1 wherein said gas concentration is between 25 vol-% and 50 vol-%.

4. The shortening as claimed in claim 1 wherein said gas concentration is between 30 vol-% and 50 vol-%.

5. The shortening as claimed in claim 1 wherein said gas concentration is between 20 vol-%.

6. The shortening as claimed in claim 1 wherein said gas concentration is about 40 Vol-%.

7. The shortening as claimed in claim 1 wherein said gas concentration is between 35 vol-% and 45 vol-%.

8. A pourable flaked solid shortening comprising:
a volume of a flaked solid shortening, and
a gas present in a concentration greater than 15 vol-%.

9. The shortening as claimed in claim 8 wherein said gas concentration is greater than 20 vol-%.

10. The shortening as claimed in claim 8 wherein said gas concentration is greater than 25 vol-%.

11. The shortening as claimed in claim 8 wherein said gas concentration is greater than 30 vol-%.

12. The shortening as claimed in claim 8 wherein said gas concentration is between 20 vol-% and 55 vol-%.

13. The shortening as claimed in claim 8 wherein said gas concentration is between 25 vol-% and 50 vol-%.

14. The shortening as claimed in claim 8 wherein said gas concentration is between 30 vol-% and 50 vol-%.

15. The shortening as claimed in claim 8 wherein said gas concentration is between 35 vol-% and 45 vol-%.

16. The shortening as claimed in claim 8 wherein said gas concentration is about 20 vol-%.

17. The shortening as claimed in claim 8 wherein said gas concentration is about 40 vol-%.

18. A dough for baking comprising:
a flour portion.
a water portion; and
a pourable flaked solid shortening portion, said flaked solid shortening comprising a gas present in a concentration of greater than 15 vol-%.

19. The shortening as claimed in claim 18 wherein said gas concentration is greater than 20 vol-%.

20. The shortening as claimed in claim 18 wherein said gas concentration is greater than 25 vol-%.

21. The shortening as claimed in claim 18 wherein said gas concentration is greater than 30 vol-%.

22. The shortening as claimed in claim 18 wherein said gas concentration is between 35 vol-% and 45 vol-%.

23. The shortening as claimed in claim 18 wherein said gas concentration is about 20 vol-%.

24. The shortening as claimed in claim 18 wherein said gas concentration is about 40 vol-%.

25. A method of generating increased expansion of a bakery product, the product containing yeast or chemically leavening, upon baking of the product comprising:
providing a flour portion;
combining a water portion to make a dough or batter;
pouring a pourable, aerated solid flaked shortening to said dough or batter to form an aerated flaked solid shortening containing dough or aerated flaked solid shortening containing batter, said aerated flaked solid shortening comprising a gas component present in a concentration of greater than 15 vol-%, and
freezing said aerated flaked solid shortening containing dough or batter.

26. The method as claimed in claim 25 wherein said gas concentration is greater than 20 vol-%.

27. The method as claimed in claim 25 wherein said gas concentration is greater than 25 vol-%.

28. The method as claimed in claim 25 wherein said gas concentration is greater than 30 vol-%.

29. The method as claimed in claim 25 wherein said gas concentration is between 35 vol-% and 45 vol-%.

30. The method as claimed in claim 25 wherein said gas concentration is about 20 vol-%.

31. The method as claimed in claim 25 wherein said gas concentration is about 40 vol-%.

32. A method of incorporating a gas into a flaked fat shortening comprising:
agitating an oil,
chilling the agitating oil to a temperature below the melting point of the oil to provide a selected viscosity oil, said oil viscosity being selected to allow incorporation into the oil of a desired volume of an gas,
injecting a gas into said selected viscosity oil to provide a gas and oil combination,
remixing said gas and oil combination, and
solidifying said remixed gas and oil combination to produce a solidified aerated shortening flake product.

33. The method as claimed in claim 32 wherein said step of solidifying comprises spraying said gas and oil combination on a chilled rotating flaking drum.

34. The method as claimed in claim 32 wherein said step of solidifying comprises spraying said gas and oil combination on a flat plate flaker.

35. The method as claimed in claim 32 wherein said step of solidifying comprises spraying said gas and oil combination on a continuous belt chiller.

36. The method as claimed in claim 32 wherein said gas concentration in said solidified aerated shortening flake product is greater than 20 vol-%.

37. The method as claimed in claim 32 wherein said gas concentration in said solidified aerated shortening flake product is greater than 25 vol-%.

38. The method as claimed in claim 32 wherein said gas concentration in said solidified aerated shortening flake product is greater than 30 vol-%.

39. The method as claimed in claim 32 wherein said gas concentration in said solidified aerated shortening flake product is between 35 vol-% and 45 vol-%.

40. The method as claimed in claim 32 wherein said gas concentration in said solidified aerated shortening flake product is about 20 vol-%.

41. The method as claimed in claim 32 wherein said gas concentration in said solidified aerated shortening flake product is about 40 vol-%.

42. A method of providing air voids and nucleating gas bubbles for collection carbon dioxide resulting from leavening agents in a bakery product comprising combining a pourable aerated flaked solid shortening with a dough, said flaked solid shortening comprising a gas present in a concentration of greater than 15 vol-%.

43. The method as claimed in claim 42 wherein said gas concentration in said solidified aerated shortening flake is greater than 20 vol-%.

44. The method as claimed in claim 42 wherein said gas concentration in said solidified aerated shortening flake is greater than 25 vol-%.

45. The method as claimed in claim 42 wherein said gas concentration in said solidified aerated shortening flake is greater than 30 vol-%.

46. The method as claimed in claim 42 wherein said gas concentration in said solidified aerated shortening flake is between 35 vol-% and 45 vol-%.

47. The method as claimed in claim 42 wherein said gas concentration in said solidified aerated shortening flake is about 20 vol-%.

48. The method as claimed in claim 42 wherein said gas concentration in said solidified aerated shortening flake is about 40 vol-%.

* * * * *

UNITED STATES PATENT AND TRADEMARK OFFICE
CERTIFICATE OF CORRECTION

PATENT NO. : 6,863,915 B2
DATED : March 8, 2005
INVENTOR(S) : Huxel, Edward T.

It is certified that error appears in the above-identified patent and that said Letters Patent is hereby corrected as shown below:

Column 13,
Line 14, delete the word "between" and insert the word -- about --.

Signed and Sealed this

Twenty-fourth Day of May, 2005

JON W. DUDAS
*Director of the United States Patent and Trademark Office*